March 7, 1950 | M. E. COLLINS | 2,499,947

REVERSIBLE FILM DRIVE MECHANISM

Filed April 11, 1946 | 2 Sheets-Sheet 1

INVENTOR.
MILFORD E. COLLINS,
BY
ATTORNEY.

March 7, 1950 M. E. COLLINS 2,499,947

REVERSIBLE FILM DRIVE MECHANISM

Filed April 11, 1946 2 Sheets-Sheet 2

INVENTOR.
MILFORD E. COLLINS,
BY Orl R. Goslow
ATTORNEY.

Patented Mar. 7, 1950

2,499,947

UNITED STATES PATENT OFFICE 2,499,947

REVERSIBLE FILM DRIVE MECHANISM

Milford E. Collins, Studio City, Calif., assignor to Radio Corporation of America, a corporation of Delaware Application April 11, 1946, Serial No. 661,274

6 Claims. (Cl. 271—2.3)

This invention relates to motion picture apparatus, and particularly to a sound film recorder adapted to record different types of sound records.

Sound film recorders of various forms are well-known in the art, one form of the general nature of this invention being shown in M. E. Collins U. S. Patent No. 2,184,546 of December 26, 1939. In this type of recorder, the film is supplied from a supply reel in a magazine from which it is pulled by a sprocket and fed to a drum on which light, modulated in accordance with sound waves, is impressed. The film then passes over the sprocket again to the take-up reel. Such recorders are generally used for standard width or 35 mm. film which has two rows of sprocket holes.

Using an optical system with an aperture, such as shown in copending G. L. Dimmick U. S. patent application, Ser. No. 629,294, filed November 17, 1945, now Patent No. 2,468,047 of April 26, 1949, light may be impressed on the film either to produce a negative sound record with normal development or to produce a positive sound record when given normal development. As pointed out in this Dimmick application, it is desirable, when a record is to be used as a printing master for color release prints, to record a direct positive record, which eliminates the step of printing from a negative to a positive record with its attendant printing and processing losses.

When films having only a single row of sprocket holes are used for sound recording and release prints, it is realized that such films are not reversible end for end in the same manner as films having a double row of sprocket holes. That is, if a film having a single row of sprocket holes has a sound track recorded in a certain direction on its edge opposite the sprocket holes, the film must always be advanced in that direction regardless of whether it is used as a printing master or as a reproducible track. It is obvious that in the case of film having a double row of sprocket holes, and thus, symmetrical about a longitudinal center line, the sound record could be recorded on either side of the film, as disclosed and claimed in R. V. P. McKie's U. S. patent application, Ser. No. 636,967, filed December 22, 1945.

When a negative record is recorded along one edge of a film having a single row of sprocket holes and then printed to a positive, emulsion to emulsion, the positive sound record film so made will be reversed end for end. That is, if a normal black and white release print is to be printed from a negative, the film on which the negative is recorded must be advanced through the recorder in a definite manner. If a positive film is required as a printing master for colored film, it must have a definite head position in order to be properly printed to the release print. Thus, in order to obtain the necessary flexibility of a recorder for films having a single row of sprocket holes, the recorder should be capable of advancing the film through the recorder with the sprocket holes on either side of the recording point, or the recorder should be capable of advancing the film through the recorder in either direction with the same efficiency.

It is well-known that one of the salient features of present-day sound film recorders is the uniform and constant speed of the film past the translation point. Because such uniform film motion is necessary, recorder film drives are constructed to provide loops, either tensioned or soft, guide rollers, and pressure rollers at particular points to insure that speed fluctuations of the film do not affect the steady motion of the film as it passes through the light beam. Thus, most sound recorders are constructed to advance the film in a certain definite direction. The present invention, therefore, is directed to a recorder which advances film in one direction only and utilizes well-known film drive principles of construction, while it also permits the recording of records having either of two head positions.

The principal object of the invention, therefore, is to facilitate the recording of various types of sound records on films having a single row of sprocket holes.

Another object of the invention is to provide a sound film recorder adapted to record a sound track having either of two head positions on film having a single row of sprocket holes.

A further object of the invention is to provide a recorder adapted to advance film therethrough in two different positions.

A still further object of the invention is to provide a sound recorder for film having a single row of sprocket holes which will record the sound track starting from different ends of the film.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
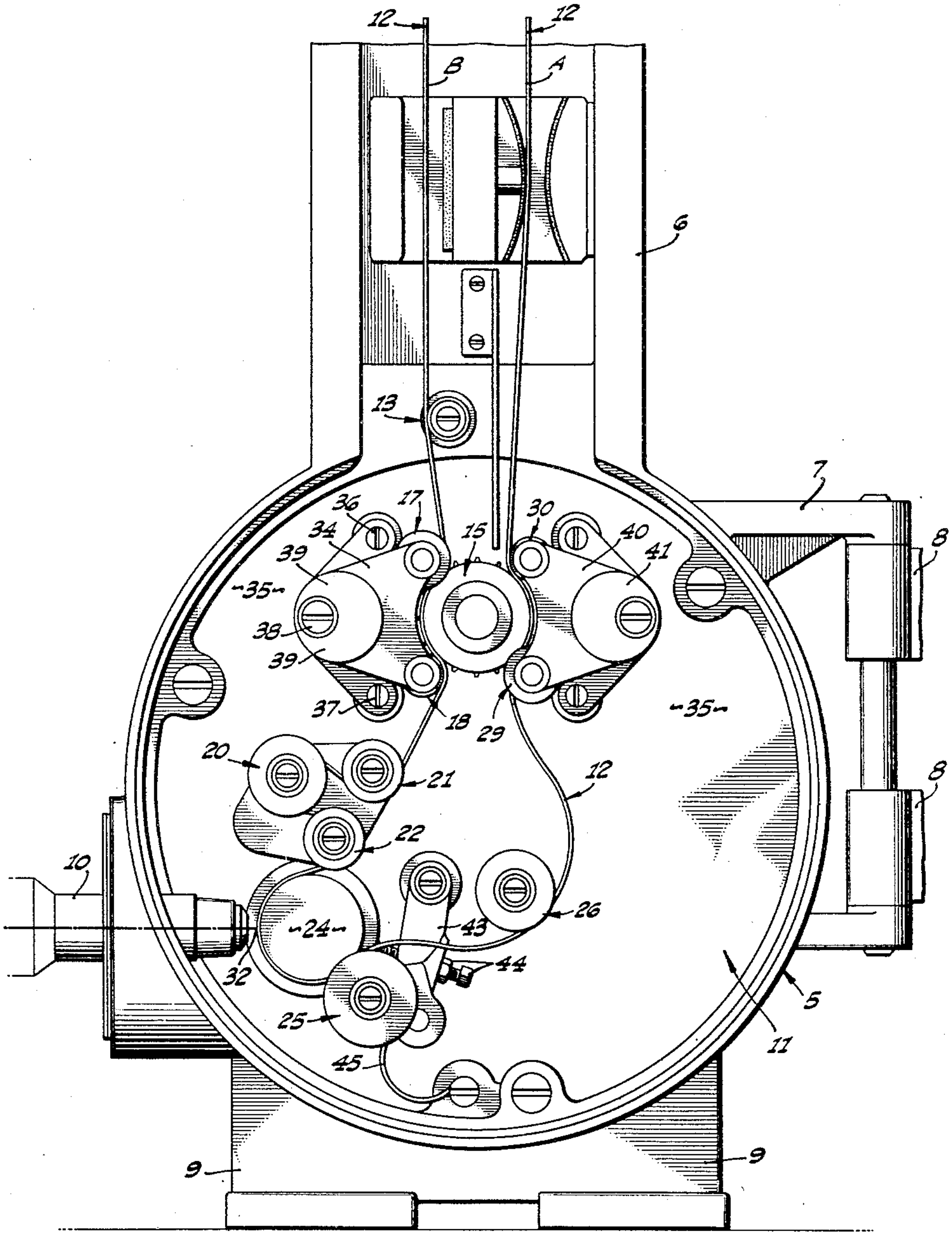
Fig. 1 is an elevational view of a film recorder embodying the invention.

Referring now to the drawings, in which like numerals identify like elements, the general appearance of the recorder and film path is the same as that shown in the above-identified Collins patent. This construction has been found to provide particularly constant and uniform film advancement past the translation point. The recorder consists of a cylindrical casing 5 having a rectangular upper portion 6 with a bracket 7 on which a door, as shown partially at 8, is hinged. The casing houses a film compartment 11 having a base 9 and back wall 35. Modulated light is projected into the compartment 11 through an optical unit 10, such as disclosed and claimed in the above-mentioned Dimmick application.

A film 12 is advanced into the recorder from a supply reel, not shown, over a guide roller 13 to a sprocket 15. The sprocket 15 is a drive sprocket for the film and pulls the film downwardly around pad rollers 17 and 18. The film is then advanced around a group of three guide rollers 20, 21, and 22 to a recording roller 24, which may be magnetically driven slightly over speed. From the roller 24, the film passes over a pressure roller 25 around a loop forming and guide roller 26 to the sprocket 15 where it is released to the take-up reel, not shown, under pad rollers 29 and 30. This general film path is similar to the one shown in the above-identified Collins patent, and will produce the same steady uniform speed of the film past the translation point 32.

The pad rollers 17 and 18 are mounted on a bracket 34 attached to the mounting plate 35 by a shaft 38. The rotation of a knurled eccentric 39 removes pad rollers 17 and 18 from the sprocket 15 to permit threading of the film over the sprocket. At points 36 and 37, eccentric cams are provided for the purpose of adjusting the operating clearance between the pad rollers and film. Similarly, pad rollers 29 and 30 are mounted on a bracket 40 and are removable from the sprocket 15 for threading the film on the sprocket by the rotation of the knurled knob 41.

The pressure roller 25 is mounted on a bracket 43 and adjustable toward and away from the surface of the recording roller 24 by the screw and nut combination 44. After once adjusted, a spring 45 provides the required tensioning for the pressure roller in both open and closed positions.

Figure 2:
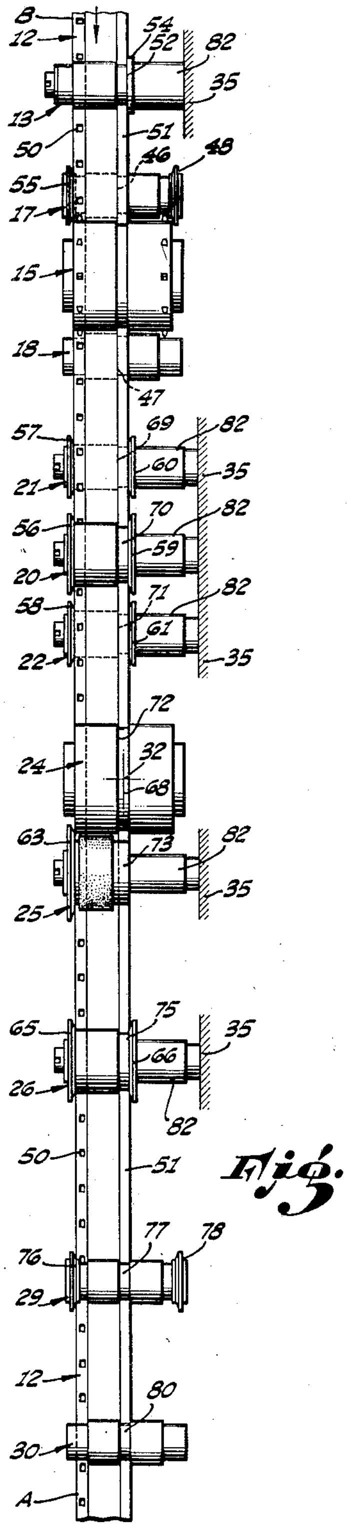
Fig. 2 is a developed view of the film path when the recorder advances film in one position therethrough.

Referring now to Fig. 2, in which the film path of the recorder of Fig. 1 has been shown developed, the film 12 has a row of sprocket holes 50 along its left edge and a sound track area 51 along its right edge. The emulsion side of the film is up. The film is advanced downwardly, A being the head end, and B, the tail end. It passes the guide roller 13 first, this roller having a flange 54 positioned adjacent the center of the roller 13 and an undercut portion 52. The film then passes pad roller 17, sprocket 15, and pad roller 18 to the three guide rollers 21, 20, and 22, entrance pad roller 17 having an edge guiding flange 55, and an undercut portion 46, while exit pad roller 18 has only an undercut portion 47. A second flange 48 is also provided on roller 17.

It will be noted that the three guide rollers have end guide flanges 56, 57, and 58 and centrally disposed guide flanges 59, 60, and 61 together with undercut portions 69, 70, and 71, respectively. The next element in the film path is the recording roller 24 with its undercut portion 72 followed by the pressure roller 25. Roller 25 has an outside guide flange 63 and an undercut portion 73. The next roller to be encountered in the film path is the loop guide roller 26 having an outside flange 65, a centrally located flange 66, and an undercut portion 75. The film then progresses between the sprocket 15 and the pad rollers 29 and 30, the sprocket not being shown at this point as it would only be a duplication of the sprocket shown above at 15. The entrance pad roller 29 has an end guide flange 76, an undercut portion 77, and a second end flange 78. The exit roller 30 has an undercut portion 80.

In the arrangement shown in Fig. 2, it will be noted that the sprocket holes are along the left edge of the film and the sound track area is along the right edge, but centrally disposed with respect to the sprocket, rollers, and recording drum. All contacting elements are undercut to protect the sound track. It will be noted that the flange 54 of roller 13 guides the right-hand edge of the film, while the flange 55 of pad roller 17 guides the left-hand edge of the film, both edges of the film thereby being guided to the sprocket 15. Where guiding is particularly important, is just prior to the film's entry on the drum 24, and to properly guide the film at this point, each of the three rollers 20, 21, and 22 have edge guiding flanges for both edges of the film. After leaving the drum 24, guiding is accomplished by the flange 63 of the pressure roller 25 and the flanges 65 and 66 of the roller 26, as well as flange 76 of entrance pad roller 29. The flanges 65 and 66 and also flange 63 are particularly necessary during acceleration of the film. After the film reaches a constant speed, the roller 26 does not function as a guide roller to any appreciable extent. Thus, as the film is advanced so that the light is impressed on the film at point 32 on roller 24, the film has a definite head end A and tail end B. The various elements are driven in the same manner as the elements in the recorder shown in the above-identified Collins patent, which provides particularly uniform film motion at point 32.

It may be observed that if the same speed stability could be obtained by advancing the film upwardly as downwardly, B would become the head end and A, the tail end. Since the recorder drive shown is not so reversible, B can be made the head end, while advancing the film in the normal downwardly direction in the manner shown in Fig. 3.

Figure 3:
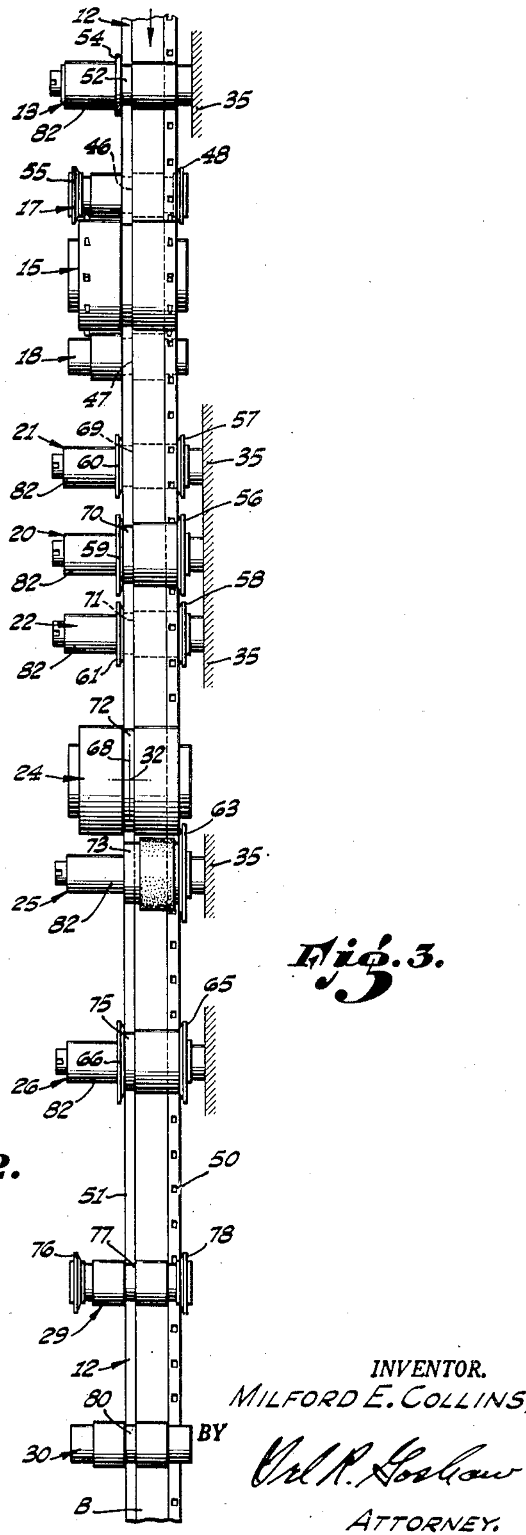
Fig. 3 is a developed view of the film path when the recorder advances film in another position therethrough.

Referring now to Fig. 3, it will be noted that the sprocket holes of the film are along the right-hand edge and the sound track area is to the left. That is, the strip of film marked A—B is now thread through the recorder so that the B end is now the head end and the A end is now the tail end. The center line 68 is in the same position in Figs. 2 and 3; that is, in the center of the sound track area and at the same position at point 32 on roller 24. This threading of the film is accomplished by reversing rollers 13, 20, 21, 22, 25, and 26, as illustrated. That is, these rollers have stub portions, as shown at 62, which space the rollers from the wall 35, as shown in Fig. 2, but permit them to have the positions shown in Fig. 3 when reversed on their shafts. Thus, the sound track area is in the same position in both Fig. 2 and Fig. 3. Since pad rollers 17 and 29 have fixed outside flanges, they do not require reversing. Thus, there is the same efficient guiding obtained for the film regardless of its threading through the recorder.

Although the specific manner of shifting the film ends is illustrated by rollers which are reversible on their shafts, it is to be understood that rollers, such as 20, 21, 22, and 26, could be slidable on their shafts and suitably held in either of their operating positions.

The purpose of being able to thread film having a single row of sprocket holes in either the A—B direction, as shown in Fig. 2, or in the B—A direction, as shown in Fig. 3, is as mentioned above and will now be briefly reviewed. First, it is desirable to be able to record a sound track in the A—B direction when a negative is required for printing a positive sound record therefrom on a composite black and white release print or a positive is to be made by the reversal process. Secondly, it is desirable to be able to record a sound track in the B—A direction when a direct positive is required as a printing master for a positive sound record on a composite color release print. Thirdly, better film motion is obtainable in a recorder designed to be driven in the same direction. The above-described recorder permits such recordings to be made with a simple change in the recorder rollers, while it obtains the optimum in speed stability. It is to be understood that the film reels will be correspondingly shifted in the magazine in any suitable manner.

I claim:

1. A sound recorder for film having a single row of sprocket holes comprising a sprocket having two rows of sprocket teeth, only one row of said teeth being used to advance film through said recorder at any one time, a drum having an undercut portion at the center thereof, a plurality of guide rollers intermediate said drum and said sprocket, certain of said rollers having flanges at the ends thereof, the flange of each particular roller which guides said film depending upon the row of sprocket teeth advancing said film, other of said rollers having flanges at one end thereof and flanges substantially in alignment with an edge of said undercut portion of said drum, and respective shafts for said guide rollers, film being advanced by one row of said sprocket teeth and between the flanges of said other rollers in one position of said other rollers on said shafts, and advanced by the other row of said sprocket teeth and between the flanges of said other rollers when said other rollers are reversed on their said respective shafts.

2. A sound film recorder for recording on a film having a single row of sprocket holes comprising a sprocket having two rows of sprocket teeth and an undercut central portion, a recording drum having an undercut central portion, a plurality of rollers having flanges at one end thereof and flanges positioned in substantial alignment with an edge of said undercut central portion to edge guide the film between said sprocket and said drum, and means for shifting said rollers with respect to the rows of said sprocket teeth for guiding film in accordance with the particular row of sprocket teeth advancing said film, the sound track area of said film lying over said undercut portions of said sprocket and drum regardless of which row of sprocket teeth advances said film.

3. A sound recorder for advancing film therethrough in either of two positions, said film having a single row of sprocket holes, comprising a sprocket having two rows of sprocket teeth, the distance between said rows of sprocket teeth being two times the distance between the center of the sprocket holes to the film edge at the greater distance from the sprocket holes less the width of the sound track area of said film, a recording drum of a width comparable to said sprocket having an undercut portion at the center thereof, a plurality of guide rollers, flanges on said rollers for guiding both edges of said film from said sprocket to said recording drum, one set of flanges being at the ends of said rollers and another set of flanges being in substantial alignment with one edge of said undercut portion of said sprocket, and shafts for said guide rollers, said rollers being reversible on said shafts to guide the film advanced by either row of sprocket teeth, the sound track area of said film lying over the undercut portion of said recording drum at all times that film is advanced through said recorder.

4. A sound film recorder for film having a single row of sprocket holes and adapted to advance film therethrough starting from either end of the film, said recorder comprising a film drive sprocket having two rows of sprocket teeth, one row of said teeth driving said film when one end of said film is started into said recorder, and the other row of said teeth driving said film when the other end of said film is started into said rcorder, a recording drum adapted to advance said film when driven by either of said rows of teeth, and adjustable flanged guide rollers for guiding both edges of said film between said sprocket and said roller when driven by either of said rows of sprocket teeth.

5. A sound film recorder in accordance with claim 4, in which said guide rollers are provided with shafts, said rollers being reversible on said shafts to laterally shift the flanges of said shafts.

6. A sound film recorder in accordance with claim 4, in which a pressure roller is provided, said pressure roller being reversible on its shaft.

MILFORD E. COLLINS.

REFERENCES CITED

The following references are of record in the file of this patent:

UNITED STATES PATENTS

| Number | Name | Date |
|---|---|---|
| 1,831,562 | Heisler | Nov. 10, 1931 |
| 2,031,756 | Boecking | Feb. 25, 1936 |